Patented June 27, 1939

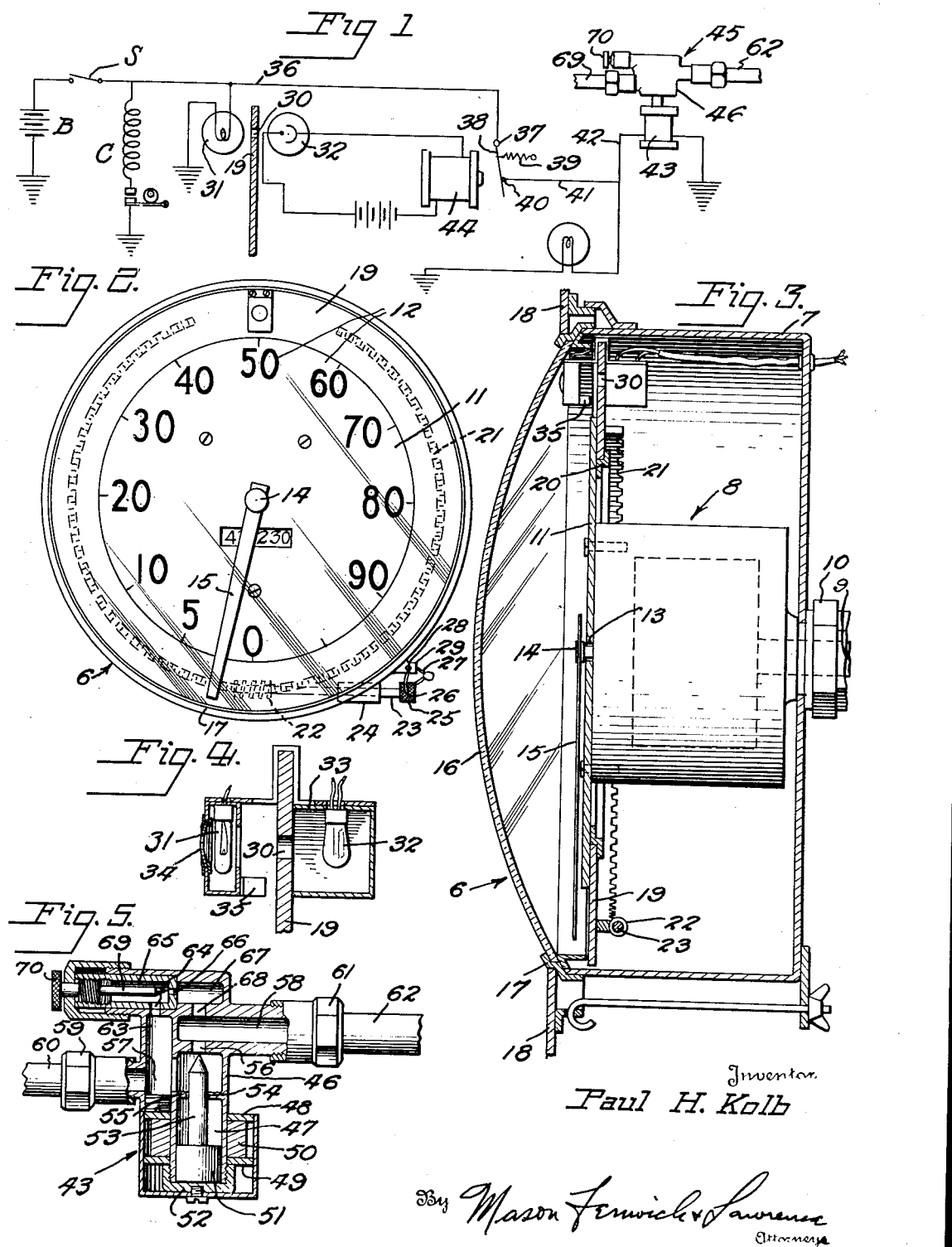

2,164,114

UNITED STATES PATENT OFFICE 2,164,114

SPEED CONTROL FOR MOTOR VEHICLES

Paul Huber Kolb, Williamsport, Pa.

Application April 19, 1937, Serial No. 137,889

2 Claims. (Cl. 250—41.5)

The invention forming the subject matter of this application relates generally to means adapted to be applied to a speedometer of a more or less conventional type to control the speed of motor vehicles, and more particularly, to such means adapted for connection to the internal combustion engines of automobiles to regulate the speeds thereof.

The main object of the invention is to provide a simple device capable of being readily attached to a speedometer mounted on and operated in accordance with the speed of an automobile, and adapted to be set to limit the speed of the automobile to a predetermined maximum.

A further object of the invention is to provide an attachment for a speedometer adapted for adjustment to indicate a selected limit of maximum speed, and which will operate to prevent the automobile on which the speedometer is mounted, exceeding the selected maximum speed.

Another object of the invention is to provide an attachment of the character described, which is capable of being sealed in its various positions of adjustment, to prevent tampering with the setting of the device by unauthorized persons.

Other objects of the invention will become apparent as the detailed description thereof proceeds.

In the drawing:

Figure 1 is a diagrammatic layout of the attachment as applied to a speedometer mounted on an automobile;

Figure 2 is an elevation of a conventional speedometer having the attachment constituting the present invention applied thereto;

Figure 3 is a central vertical section to an enlarged scale of the mechanism illustrated in Figure 2;

Figure 4 is a section to an enlarged scale through a photoelectric cell forming part of the present invention; and Figure 5 is a central vertical section through valve mechanism controlled by the photoelectric cell shown in Figure 4 to regulate the quantity of liquid fuel delivered to the carburetor of an internal combustion engine.

As shown in the drawing, the control attachment is adapted to be applied to a speedometer, designated generally by the reference numeral 6, and operably connected to some part of the automobile engine, in any well-known manner, to indicate the speed of the automobile. The invention is not concerned with the structural details of the speedometer, or with its connection to the rotating member which sets it in operation. Any conventional type of speedometer may be provided with this attachment.

The speedometer 6 comprises the usual casing 7 enclosing the usual speed responsive mechanism connected for operation by the usual speed responsive flexible shaft 9 passing through the fitting 10 in the rear wall of the said casing. The mechanism 8 is fixed with respect to the outer casing 7, and has suitably secured thereto a dial 11 provided with the usual speed indicating scale 12. The dial 11 is provided with a central aperture 13 through which projects the speed responsive shaft 14 to the end of which is secured the speed indicating pointer 15. A transparent cover 16, secured to the casing 7 by the bezel 17, encloses the speed indicating dial 11 and pointer 15, as usual in devices of this kind. The speedometer 6 is intended to be suitably secured in any convenient position on the dashboard 18 of the automobile.

As so far described, the speedometer and its operating mechanism is conventional. The invention as applied to this speedometer, comprises an annular disc or speed ring 19 mounted on the rear of the dial 11 concentric with the axis of the speed controlled shaft 13. The disc 19 is secured rotatably to the rear of said dial by means of the Z-shaped annulus 20 which is suitably secured to the rear wall of the dial 11. A crown gear 21 is secured to the rear face of the annulus 19; and the teeth of the crown gear are shaped to mesh with the threads of a worm 22 suitably secured to a shaft 23 journaled in a bearing 24 formed in the wall of the casing 7. The outer end of the shaft 23 is provided with a knurled adjusting nut 25 having a series of apertures 26 adapted to receive a sealing wire 27, which may also pass through apertures 28 in a lug 29 suitably secured to the outside of the casing 7.

The speed ring 19 is provided near its periphery with an aperture 30 designed to permit the passage of rays of light from a lamp 31 to a photoelectric tube 32. The lamp 31 and tube 32 are suitably mounted in a casing 33 which is fixed to the speed ring 19, the photoelectric cell 32 being arranged in the rear of said ring, while the light 31 is arranged in front thereof. The casing 33 is provided with a lens 34 to expose the bulb 31 and thereby indicate that the control is in operation.

Below and to the rear of the lamp 31 the casing 33 is provided with a stop 35 arranged in the path of movement of the outer end of the speed indicating pointer 15. This stop 35 prevents the indicating pointer 15 from passing to speed indications higher than that interposed between the lamp 31 and photoelectric cell 32. It will be obvious from inspection of the drawing that the speed ring 19 may be adjusted so as to set the ring with its light transmitting aperture 30 in radial alignment with the axis of the shaft and any desired speed indication on the dial 11.

Referring to the diagrammatic layout of Figure 1, there is illustrated a battery B connected through the usual ignition switch S to the distributor coil C of the motor vehicle. The switch S is connected by a wire 36 to the pivoted end 37 of a conducting armature 38 which is normally held by a spring 39 against a contact terminal 40 connected by wires 41 and 42 to a grounded solenoid 43. It will be apparent from inspection of Figure 1 that when the electromagnet 44, connected to the photoelectric cell 32, is energized, the armature 38 will be moved from the terminal 40, so that the circuit through the solenoid 43 will be broken so long as light passes from the lamp 31 through the aperture 30 to the cell 32. This condition will be maintained, so long as the speed indicating pointer does not intercept the rays of light from the lamp 31 to the cell 32. This means that so long as the speed of the vehicle does not exceed the speed for which the speed ring 19 is adjusted, the solenoid 43 will be deenergized, and a full supply of gasoline from the pump or tank will flow through the valve fitting designated generally by the reference numeral 45.

The fitting 45 (see Figures 1 and 5) comprises a casting 46 having a cylinder 47 formed therein. The casting 46 is provided with flanges 48 and 49 spaced apart to form an annular chamber in which is mounted the solenoid 50. The cylinder 47 has slidably mounted therein a cylindrical bore 51 normally seated in a cup 52 screwthreaded to the lower end of the casting 46. The upper end of the core 51 has a needle valve 53 projecting therefrom to slide through an aperture 54 formed in a diaphragm 55. The upper end of the needle valve 53 is adapted when the solenoid 50 is energized to close an aperture 56 which effects communication between a gasoline inlet chamber 57 and an outlet chamber 58. The inlet chamber 57 is connected by a fitting 59 through a pipe 60 to a source of liquid fuel supply, commonly provided on automobiles. The outlet chamber 58 is connected by a fitting 61 through a pipe 62 to the usual carburetor (not shown) of the internal combustion engine for operating the automobile.

It will be apparent from inspection of Figures 1 and 5, that when the solenoid 50 is deenergized, the full supply of liquid fuel passes through the pipe 60 and the fitting 46 to the pipe 62 and the carburetor. The speed of the vehicle will then vary with the operation of the automobile accelerator so long as it remains below the maximum speed for which the instrument is set.

As soon as the pointer 15 makes contact with the stop 35, it blocks passage of light rays from the lamp 31 to the photoelectric cell 32. This immediately causes deenergization of the electromagnet 44 and permits the spring 39 to pull the armature 38 into contact with the terminal 40 which, as shown in Figure 1, is connected to the carburetor controlling solenoid 43. Energization of the solenoid 43 raises the core 51 and the needle valve 53 to close the passageway 56, leading through chamber 58 to the carburetor inlet pipe 62.

In order to prevent actual stopping of the automobile, the fitting 45 is provided with a by-pass to permit flow of liquid fuel from the inlet chamber 57 sufficient to operate the automobile at a speed below the maximum, even while the speedometer pointer cuts off the supply of light to the photoelectric cell.

The by-pass referred to comprises an extension 63 of the inlet chamber 57. This extension is provided with an aperture 64 effecting communication between the chamber 57 and a chamber 65, which has an end wall provided with an aperture 66 leading to a chamber 67 in communication through an aperture 68 with the gasoline outlet chamber 58 leading to the carburetor. A manually operable needle valve 69 is mounted for adjustment in the chamber 65 by means of the thumb nut 70, so as to control and vary the quantity of liquid fuel passing through the apertures 64, 66 and 68 to the outlet chamber for the carburetor. It will be apparent that the flow of liquid fuel through the by-pass may be adjusted so as to permit operation of the vehicle at all speeds below the maximum of the speed for which the control is set. When the speed decreases below the set speed, the pointer 15 moves away from the stop 35. The solenoid 43 then becomes deenergized, and the vehicle may be operated at any speed below the maximum for which the device is adjusted.

It is to be understood that the invention is not to be considered as limited to the specific construction and arrangement described herein, since it is evident that many changes may be made without departing from the scope of the invention as defined by the claims appended hereto.

What I claim is:

1. A speed actuated switch comprising a fixed dial and a pointer rotatable over said dial, an annular disk angularly adjustable on said dial about the axis of said pointer and extending beyond the periphery of said dial, said disk being provided with an aperture through the part thereof projecting beyond the periphery of said dial, a source of light and a photoelectric cell mounted on opposite sides of said disk so that the rays of light from said source of light pass normally through said aperture to said cell, and a control circuit including a switch operable by said photoelectric cell when said pointer intercepts said light rays.

2. A speed actuated switch comprising a fixed dial and a pointer rotatable over said dial, an annular disk angularly adjustable on said dial about the axis of said pointer and extending beyond the periphery of said dial, said disk being provided with an aperture through the part thereof projecting beyond the periphery of said dial, a source of light and a photoelectric cell mounted on opposite sides of said disk so that the rays of light from said source of light pass normally through said aperture to said cell, means for angularly adjusting said disk about said axis, and a control circuit including a switch operable by said photoelectric cell when said pointer intercepts said light rays.

PAUL HUBER KOLB.